(12) United States Patent
Bendall (10) Patent No.: US 9,621,808 B2
(45) Date of Patent: Apr. 11, 2017

(54) INSPECTION APPARATUS METHOD AND APPARATUS COMPRISING SELECTIVE FRAME OUTPUT

(71) Applicant: General Electric Company, Schenectady, NY (US)

(72) Inventor: Clark Alexander Bendall, Syracuse, NY (US)

(73) Assignee: General Electric Company, Schenectady, NY (US)

(*) Notice: Subject to any disclaimer, the term of this patent is extended or adjusted under 35 U.S.C. 154(b) by 11 days.

(21) Appl. No.: 14/331,084

(22) Filed: Jul. 14, 2014

(65) Prior Publication Data

US 2014/0320700 A1 Oct. 30, 2014

Related U.S. Application Data (63) Continuation of application No. 11/642,569, filed on Dec. 20, 2006, now Pat. No. 8,810,636.

(51) Int. Cl.
*H04N 5/232* (2006.01)
*H04N 5/355* (2011.01)
(Continued)

(52) U.S. Cl.
CPC ......... *H04N 5/23267* (2013.01); *H04N 5/232* (2013.01); *H04N 5/23245* (2013.01);
(Continued)

(58) Field of Classification Search
CPC ........... H04N 5/23254; H04N 5/23267; H04N 5/23293; H04N 5/23245; H04N 5/35536;
(Continued)

(56) References Cited

U.S. PATENT DOCUMENTS

| 2,929,866 A | 3/1960 | Melamed |
| 3,188,386 A | 6/1965 | Byatt |

(Continued)

FOREIGN PATENT DOCUMENTS

| AU | 4573101 | 10/2001 |
| CA | 2405434 | 10/2001 |

(Continued)

OTHER PUBLICATIONS

International Search Report for International Patent Application No. PCT/US2007/086942, dated Dec. 18, 2008 (6 pages).

(Continued)

*Primary Examiner* — Christopher K Peterson
(74) *Attorney, Agent, or Firm* — Fletcher Yoder, P.C.

(57) ABSTRACT

A method of operating an inspection device includes collecting a plurality of successive image frames using an image sensor of the inspection device and displaying the plurality of successive image frames on a display of the inspection device. The method includes processing, via a processor of the inspection device, each image frame of the plurality of successive image frames by determining a motion parameter of each respective image frame and adding each respective image frame to a frame buffer when the respective image frame is motion free. The method includes receiving a control signal from a user interface of the inspection device requesting an image frame output. The method further includes determining, via the processor of the inspection device, a noise-reduced image frame from the frame buffer in response to the control signal and outputting the noise-reduced image frame in response to the control signal.

20 Claims, 6 Drawing Sheets

(51) Int. Cl.
*H04N 7/18* (2006.01)
*H04N 5/225* (2006.01)

(52) U.S. Cl.
CPC ..... *H04N 5/23254* (2013.01); *H04N 5/23293* (2013.01); *H04N 5/355* (2013.01); *H04N 5/35536* (2013.01); *H04N 7/183* (2013.01); *H04N 2005/2255* (2013.01)

(58) Field of Classification Search
CPC ... A61B 1/00002–1/00009; A61B 1/04–1/055; G02B 23/243; G02B 23/2415; G02B 7/001; G06T 2207/10068
See application file for complete search history.

(56) References Cited

U.S. PATENT DOCUMENTS

| | | |
|---|---|---|
| 3,493,748 A | 2/1970 | Tajima |
| 3,515,800 A | 6/1970 | Ebihara et al. |
| 3,623,126 A | 11/1971 | Newhouse |
| 3,783,190 A | 1/1974 | Gaebele |
| 3,845,242 A | 10/1974 | Richeson, Jr. et al. |
| 3,934,081 A | 1/1976 | Schumacher |
| 3,980,819 A | 9/1976 | Schwartz |
| 4,115,804 A | 9/1978 | Morton et al. |
| 4,354,749 A | 10/1982 | Hosoda |
| 4,410,914 A | 10/1983 | Siau |
| 4,433,346 A | 2/1984 | Stoffel et al. |
| 4,442,452 A | 4/1984 | Kurata et al. |
| 4,476,494 A | 10/1984 | Tugaye et al. |
| 4,491,865 A | 1/1985 | Danna et al. |
| 4,516,153 A | 5/1985 | Krull et al. |
| 4,546,381 A | 10/1985 | Kurata et al. |
| 4,547,809 A | 10/1985 | Southgate |
| 4,608,606 A | 8/1986 | Levine |
| 4,622,954 A | 11/1986 | Arakawa et al. |
| 4,646,723 A | 3/1987 | Arakawa |
| 4,658,956 A | 4/1987 | Takeda et al. |
| 4,668,978 A | 5/1987 | Gokita |
| 4,682,219 A | 7/1987 | Arakawa |
| 4,692,608 A | 9/1987 | Coooer et al. |
| 4,695,878 A | 9/1987 | Levine et al. |
| 4,700,693 A | 10/1987 | Lia et al. |
| 4,706,654 A | 11/1987 | Ogiu et al. |
| 4,720,178 A | 1/1988 | Nishioka et al. |
| 4,727,859 A | 3/1988 | Lia |
| 4,733,937 A | 3/1988 | Lia et al. |
| 4,735,501 A | 4/1988 | Ginsburgh et al. |
| 4,741,327 A | 5/1988 | Yabe |
| 4,745,470 A | 5/1988 | Yabe et al. |
| 4,745,471 A | 5/1988 | Takamura et al. |
| 4,747,327 A | 5/1988 | Itoh et al. |
| 4,757,805 A | 7/1988 | Yabe |
| 4,758,891 A | 7/1988 | Hitchcock et al. |
| 4,777,385 A | 10/1988 | Hartmeier |
| 4,777,524 A | 10/1988 | Nakajima et al. |
| 4,779,130 A | 10/1988 | Yabe |
| 4,786,965 A | 11/1988 | Yabe |
| 4,787,369 A | 11/1988 | Allred, III et al. |
| 4,790,294 A | 12/1988 | Allred, III et al. |
| 4,794,912 A | 1/1989 | Lia |
| 4,796,607 A | 1/1989 | Allred, III et al. |
| 4,807,026 A | 2/1989 | Nishioka et al. |
| 4,809,680 A | 3/1989 | Yabe |
| 4,862,253 A | 8/1989 | English et al. |
| 4,868,644 A | 9/1989 | Yabe et al. |
| 4,868,646 A | 9/1989 | Tsuji |
| 4,873,572 A | 10/1989 | Miyazaki et al. |
| 4,887,154 A | 12/1989 | Wawro et al. |
| 4,890,159 A | 12/1989 | Ogiu |
| 4,895,431 A | 1/1990 | Tsujiuchi et al. |
| 4,901,143 A | 2/1990 | Uehara et al. |
| 4,909,600 A | 3/1990 | Ciarlei et al. |
| 4,913,369 A | 4/1990 | Lia et al. |
| 4,918,521 A | 4/1990 | Yabe et al. |
| 4,933,757 A | 6/1990 | Kanno et al. |
| 4,941,454 A | 7/1990 | Wood et al. |
| 4,941,456 A | 7/1990 | Wood et al. |
| 4,962,751 A | 10/1990 | Krauter |
| 4,969,034 A | 11/1990 | Salvati |
| 4,979,035 A | 12/1990 | Uehara et al. |
| 4,980,763 A | 12/1990 | Lia |
| 4,989,581 A | 2/1991 | Tamburrino et al. |
| 4,993,405 A | 2/1991 | Takamura et al. |
| 4,998,182 A | 3/1991 | Krauter et al. |
| 4,998,971 A | 3/1991 | Fukunishi |
| 5,014,515 A | 5/1991 | Krauter |
| 5,014,600 A | 5/1991 | Krauter et al. |
| 5,018,436 A | 5/1991 | Evangelista et al. |
| 5,018,506 A | 5/1991 | Danna et al. |
| 5,019,121 A | 5/1991 | Krauter |
| 5,021,888 A | 6/1991 | Kondou et al. |
| 5,023,570 A | 6/1991 | Matsumoto |
| 5,032,913 A | 7/1991 | Hattori et al. |
| 5,034,888 A | 7/1991 | Uehara et al. |
| 5,047,848 A | 9/1991 | Krauter |
| 5,052,803 A | 10/1991 | Krauter |
| 5,061,995 A | 10/1991 | Lia et al. |
| 5,066,122 A | 11/1991 | Krauter |
| 5,070,401 A | 12/1991 | Salvati et al. |
| 5,114,636 A | 5/1992 | Evangelista et al. |
| 5,140,975 A | 8/1992 | Krauter |
| 5,155,585 A | 10/1992 | Ishikawa |
| 5,164,824 A | 11/1992 | Ieoka et al. |
| 5,191,879 A | 3/1993 | Krauter |
| 5,202,758 A | 4/1993 | Tamburrino |
| 5,203,319 A | 4/1993 | Danna et al. |
| 5,220,198 A | 6/1993 | Tsuji |
| 5,270,810 A | 12/1993 | Nishimura et al. |
| 5,275,152 A | 1/1994 | Krauter et al. |
| 5,278,642 A | 1/1994 | Danna et al. |
| 5,278,656 A | 1/1994 | Hynecek et al. |
| 5,291,151 A | 3/1994 | Fujiwara et al. |
| 5,305,098 A | 4/1994 | Matsunaka et al. |
| 5,314,070 A | 5/1994 | Ciarlei |
| 5,323,899 A | 6/1994 | Strom et al. |
| 5,345,339 A | 9/1994 | Knieriem et al. |
| 5,347,989 A | 9/1994 | Monroe et al. |
| 5,365,331 A | 11/1994 | Tamburrino et al. |
| 5,369,446 A | 11/1994 | Parker et al. |
| 5,373,317 A | 12/1994 | Salvati et al. |
| 5,377,669 A | 1/1995 | Schulz |
| 5,387,928 A | 2/1995 | Nishimura et al. |
| D358,471 S | 5/1995 | Cope et al. |
| 5,418,566 A | 5/1995 | Kameishi |
| 5,420,644 A | 5/1995 | Watanabe et al. |
| 5,435,296 A | 7/1995 | Vivenzio et al. |
| 5,441,043 A | 8/1995 | Wood et al. |
| 5,469,210 A | 11/1995 | Noguchi et al. |
| 5,515,449 A | 5/1996 | Tsuruoka et al. |
| 5,568,190 A | 10/1996 | Noguchi et al. |
| 5,587,736 A | 12/1996 | Walls |
| 5,614,943 A | 3/1997 | Nakamura et al. |
| 5,617,136 A | 4/1997 | Iso et al. |
| 5,631,695 A | 5/1997 | Nakamura et al. |
| 5,633,675 A | 5/1997 | Danna et al. |
| 5,667,474 A | 9/1997 | Nishimura et al. |
| 5,675,378 A | 10/1997 | Takasugi et al. |
| 5,694,530 A | 12/1997 | Goto |
| 5,696,850 A | 12/1997 | Parulski et al. |
| 5,701,155 A | 12/1997 | Wood et al. |
| 5,730,129 A | 3/1998 | Darrow et al. |
| 5,733,246 A | 3/1998 | Forkey |
| 5,734,418 A | 3/1998 | Danna |
| 5,749,362 A | 5/1998 | Funda et al. |
| 5,749,827 A | 5/1998 | Minami |
| 5,754,313 A | 5/1998 | Pelchy et al. |
| 5,764,809 A | 6/1998 | Nomami et al. |
| 5,776,049 A | 7/1998 | Takahashi |
| 5,779,625 A | 7/1998 | Suzuki et al. |
| 5,788,628 A | 8/1998 | Matsuno et al. |
| 5,796,427 A | 8/1998 | Suzuki et al. |
| 5,821,532 A | 10/1998 | Beaman et al. |
| 5,823,958 A | 10/1998 | Truppe |

(56) References Cited

U.S. PATENT DOCUMENTS

| | | |
|---|---|---|
| 5,840,014 A | 11/1998 | Miyano et al. |
| 5,857,963 A | 1/1999 | Pelchy et al. |
| 5,860,912 A | 1/1999 | Chiba |
| 5,877,803 A | 3/1999 | Wee et al. |
| 5,883,610 A | 3/1999 | Jeon |
| 5,946,034 A | 8/1999 | Cortiula |
| 5,951,464 A | 9/1999 | Takahashi et al. |
| 5,953,013 A | 9/1999 | Shimizu |
| 5,956,416 A | 9/1999 | Tsuruoka et al. |
| 5,964,696 A | 10/1999 | Mihalca et al. |
| 5,983,120 A | 11/1999 | Groner et al. |
| 5,990,471 A | 11/1999 | Watanabe et al. |
| 6,002,430 A | 12/1999 | McCall et al. |
| 6,008,939 A | 12/1999 | Hebert |
| 6,075,555 A | 6/2000 | Street |
| 6,083,152 A | 7/2000 | Strong |
| 6,084,461 A | 7/2000 | Colbeth et al. |
| 6,088,612 A | 7/2000 | Blair |
| 6,097,848 A | 8/2000 | Salvati |
| 6,108,005 A | 8/2000 | Starks et al. |
| 6,120,435 A | 9/2000 | Eino et al. |
| 6,172,361 B1 | 1/2001 | Holberg et al. |
| 6,184,514 B1 | 2/2001 | Rezende et al. |
| 6,191,809 B1 | 2/2001 | Hori et al. |
| 6,211,904 B1 | 4/2001 | Adair et al. |
| 6,266,430 B1 | 7/2001 | Rhoads |
| 6,310,647 B1 | 10/2001 | Parulski et al. |
| 6,313,456 B1 | 11/2001 | Miyashita et al. |
| 6,373,523 B1 | 4/2002 | Jang |
| 6,428,650 B1 | 8/2002 | Chung |
| 6,461,298 B1 | 10/2002 | Fenster et al. |
| 6,468,201 B1 | 10/2002 | Burdick |
| 6,472,247 B1 | 10/2002 | Andoh et al. |
| 6,483,535 B1 | 11/2002 | Tamburrino et al. |
| 6,494,739 B1 | 12/2002 | Vivenzio et al. |
| 6,538,732 B1 | 3/2003 | Drost et al. |
| 6,547,721 B1 | 4/2003 | Higuma et al. |
| 6,590,470 B1 | 7/2003 | Burdick |
| 6,721,361 B1* | 4/2004 | Covell ................ G11B 27/031 348/594 |
| 6,830,545 B2 | 12/2004 | Bendall |
| 6,842,196 B1 | 1/2005 | Swift et al. |
| 6,953,432 B2 | 10/2005 | Schiefer |
| 7,134,993 B2 | 11/2006 | Lia et al. |
| 7,605,854 B2 | 10/2009 | Terzioglu |
| 8,213,676 B2 | 7/2012 | Bendall |
| 8,368,749 B2 | 2/2013 | Lambdin et al. |
| 2003/0067544 A1 | 4/2003 | Wada |
| 2004/0183900 A1 | 9/2004 | Karpen et al. |
| 2004/0212808 A1* | 10/2004 | Okawa ................ A61B 1/00009 356/479 |
| 2004/0215413 A1 | 10/2004 | Weldum et al. |
| 2005/0050707 A1 | 3/2005 | Scott et al. |
| 2005/0129108 A1 | 6/2005 | Bendall et al. |
| 2005/0162643 A1 | 7/2005 | Karpen |
| 2005/0163402 A1* | 7/2005 | Aiso ................ G06T 3/4069 382/300 |
| 2005/0275725 A1* | 12/2005 | Olsson ................ G03B 37/005 348/207.99 |
| 2005/0281520 A1 | 12/2005 | Kehoskie et al. |
| 2006/0050983 A1 | 3/2006 | Bendall et al. |
| 2006/0072903 A1 | 4/2006 | Weldum et al. |
| 2006/0082646 A1 | 4/2006 | Abe et al. |
| 2006/0140600 A1 | 6/2006 | Suda |
| 2006/0158523 A1 | 7/2006 | Estevez et al. |
| 2006/0164511 A1* | 7/2006 | Krupnik ................ H04N 7/181 348/65 |
| 2006/0187324 A1 | 8/2006 | Lin |

FOREIGN PATENT DOCUMENTS

| | | |
|---|---|---|
| CN | 1798264 | 7/2006 |
| DE | 4203630 | 8/1992 |
| DE | 602005003749 | 12/2008 |
| EP | 1290636 | 3/2003 |
| EP | 1649801 | 4/2006 |
| JP | S-59215772 | 12/1984 |
| JP | S-63292119 | 11/1988 |
| JP | 04-259442 | 9/1992 |
| JP | 07-246184 | 9/1995 |
| JP | 11-032986 | 2/1999 |
| JP | 11249031 | 9/1999 |
| JP | 2000107120 | 4/2000 |
| JP | 2001095757 | 4/2001 |
| JP | 2003534837 | 11/2003 |
| JP | 2006115964 | 5/2006 |
| JP | 2006186592 | 7/2006 |
| WO | WO-0175798 | 10/2001 |

OTHER PUBLICATIONS

Jill M. Boyce, "Noice Reduction of Image Sequences Using Adaptive Motion Compensated Frame Averaging", 1992, IEEE, p. 1-4.

* cited by examiner

INSPECTION APPARATUS METHOD AND APPARATUS COMPRISING SELECTIVE FRAME OUTPUT

CROSS REFERENCE TO RELATED APPLICATIONS

This application is a continuation of U.S. application Ser. No. 11/642,569, filed on Dec. 20, 2006, and is related to U.S. Pat. No. 8,213,676, filed on Dec. 20, 2006, the disclosures of which are hereby incorporated by reference in their entirety for all purposes.

FIELD OF THE INVENTION

The invention relates to inspection apparatuses generally and more particularly to visual inspection apparatuses.

BACKGROUND OF THE PRIOR ART

Inspection apparatuses can be used to develop streaming video image representation of areas to be inspected. In one embodiment an inspection apparatus can be used to inspect industrial equipment articles. At certain times during operation of an inspection apparatus an inspector may initiate a freeze frame control signal. When a freeze frame control signal is initiated, a buffered frame of image data retained in a frame buffer can continually be read out to a display. At other times during operation of an inspection apparatus an inspector may initiate a save frame control signal. When a save frame control signal is initiated, a buffered frame of image data retained in a frame buffer can be written to a memory location of a memory device for later use, e.g., a volatile memory device, a non-volatile memory device, or to a long term storage device.

In typical operation the first frame of image data having a capture initiation time subsequent to the time of initiation of a control signal to output a frame of image data to a display or memory is the frame that is subject to output. Unfortunately, the frame having the first capture initiation time subsequent to an initiation of a control signal to output a frame is not always a high quality frame of image data. If the inspection apparatus is being moved at the time of initiation of a control signal to output a frame of image data, low quality image may be saved.

DETAILED DESCRIPTION OF THE INVENTION

Figure 1:
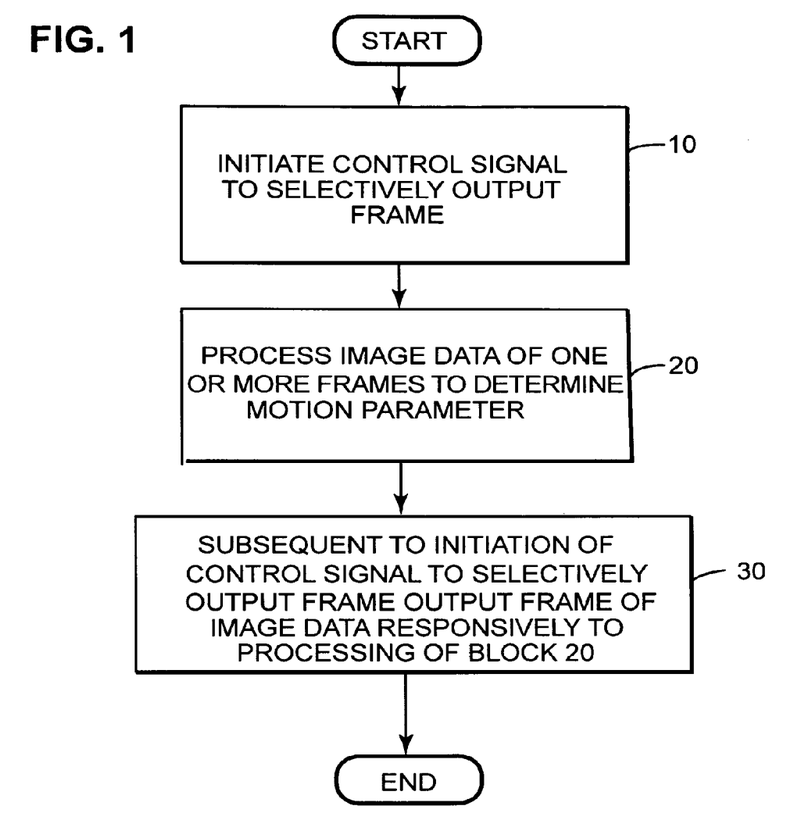
FIG. 1 is a flow diagram illustrating a method that can be carried out with one of an inspection apparatus.

A simplified flow diagram illustrating a process for selectively outputting a high quality frame of image data is shown in FIG. 1. At black 10, a control signal to selectively output a frame of image data can be initiated. At block 20, apparatus 100 can process image data of one or more frames and can determine a motion parameter. In one embodiment, apparatus 100 can determine a motion parameter for each frame of image data processed. At block 30 apparatus 100 can selectively output a frame of image data responsively to processing at block 20. By selectively outputting a frame of image data subsequently to a frame retention control signal being initiated, the quality of the frame of image data that can be output can be improved. A technical effect of the processing described with reference to the flow diagram of FIG. 1 is to improve the quality of an output frame of image data. Accordingly, there is described herein, in one embodiment, a method for operating an inspection apparatus having an elongated inspection tube and an image sensor for generating image signals, said method comprising the steps of: initiating a control signal to selectively output a frame of image data; processing image data of one or more frames to determine a motion parameter; and subsequent to initiation of a control signal to selectively output a frame, outputting a frame of image data responsively to said processing to determine a motion parameter. In outputting a frame, an inspection apparatus can output to a display and/or an addressable memory location for later use a frame retained in a frame buffer that is continually written over during the course of operation of the apparatus. The frame buffer can be, e.g., an input frame buffer, an output frame buffer, or an accumulator frame buffer. The memory location to which the buffered frame can be written to can be a memory location of a memory device, e.g., a volatile memory device, a non-volatile memory device, or a storage device.

In some embodiments, image data that is subject to processing is frame image data captured subsequent to the time of initiation of a control signal to selectively output a frame of image data. In other embodiments, image data that is subject to processing is frame image data captured prior to the time of initiation of a control signal to selectively output a frame of image data. In other embodiments, frame image data subject to processing can comprise both frame image data of single frames having capture initiation times of subsequent to and prior to the time of initiation of a control signal to selectively output a frame of image data. Frame image data that is subject to processing for determining a motion parameter can comprise a full frame of image data or less than a full frame of image data. For example, in one embodiment a limited number of rows of image data can be processed. In another embodiment, a limited number of columns can be processed. In another embodiment, where image sensor 132 is provided to be capable of an interlaced readout mode, a single field (e.g., an odd-field or an even field) can be processed. When capturing a frame of image data, apparatus 100 need not simultaneously retain each image data element of a frame of image data. For example, when capturing a frame of image data subject to processing, apparatus 100 may buffer a limited amount of frame image data (e.g., pixel values corresponding to a few rows of pixels) at a given instant in time.

A motion parameter can be developed for each frame subject to processing. A motion parameter that can be developed for each frame having image data subject to processing can comprise a binary two-state parameter, i.e., a frame can be designated as being "in motion" or "motion free." A motion parameter that is developed for each frame of image data subject to processing at block 20 can, in addition or in the alternative, comprise a qualitative measurement of motion. For example, a motion score can be ascribed to each frame of image data corresponding to the degree of motion determined to be present in the frame of image data.

Figure 2:
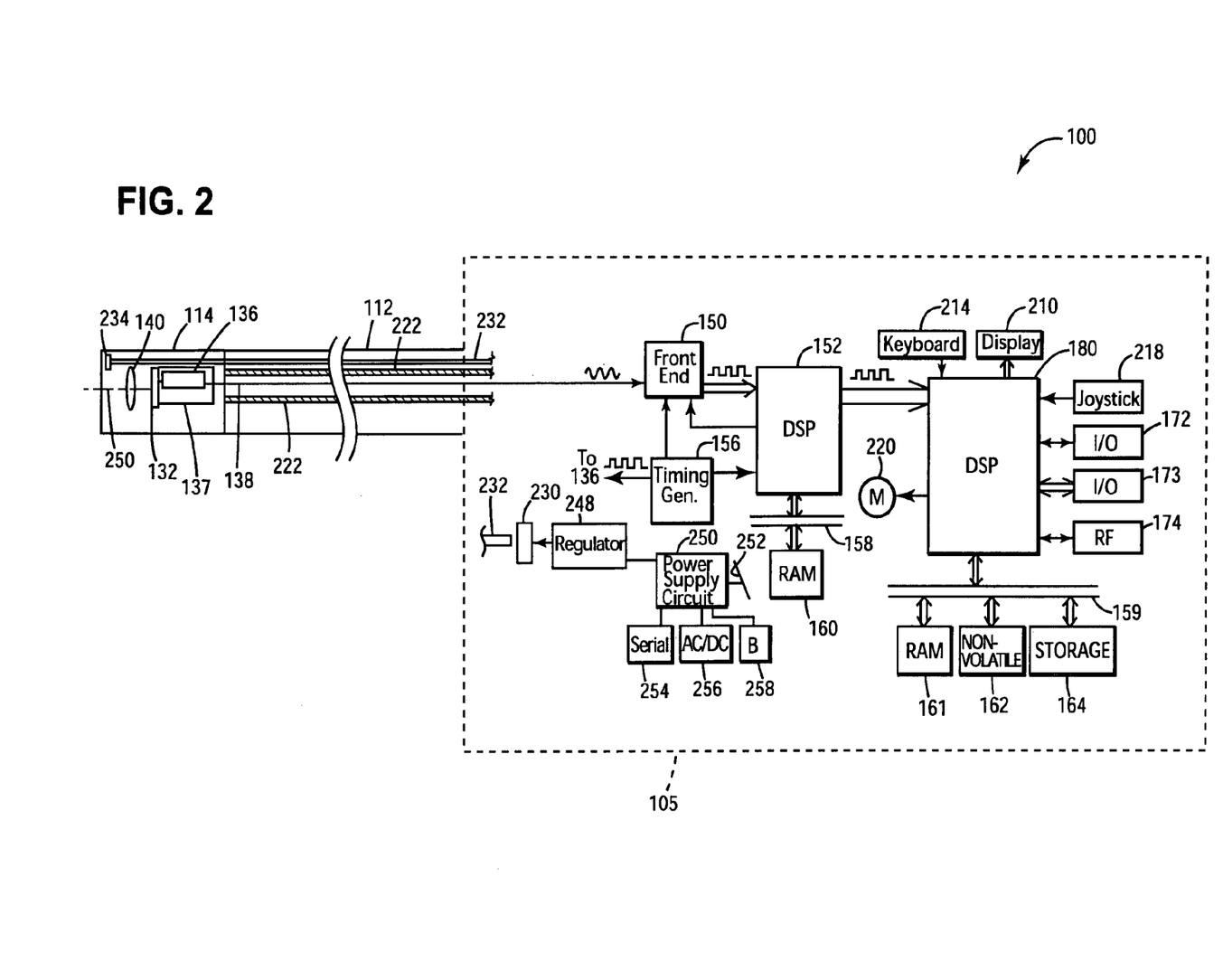
FIG. 2 is as electrical block diagram illustrating an exemplary set of circuits that can be incorporated in an inspection apparatus.

A block diagram of an exemplary apparatus capable of supporting the above described processing is shown and described in connection with FIG. 2. Inspection apparatus 100 can include an elongated inspection tube 112 and a head assembly 114 disposed at a distal end of the elongated inspection tube. Head assembly 114 can include solid state image sensor 132 and imaging lens 140. Imaging lens 140 can focus an image onto an active surface of solid state image sensor 132. Imaging lens 140 can comprise, e.g., a lens singlet or a lens having multiple components, e.g., a lens doublet, a lens triplet. Solid state image sensor 132 can be, e.g., a CCD or CMOS image sensor. Solid state image sensor 132 can include a plurality of pixels formed in a plurality of rows and columns. Solid state image sensor 132 can provided on an integrated circuit. Image sensor 132 can generate image signals in the form of analog voltages representative of light incident on each pixel of the image sensor. Referring to further aspects of head assembly 114, image sensor 132 can be controlled so that image signals are clocked out from image sensor 132. Analog voltages representative of light incident on the various pixels of image sensor 132 can be propagated through signal conditioning circuit 136 along a cable, e.g., a coaxial cable disposed within elongated inspection tube 112. Head assembly 114 can include signal conditioning circuit 136 when conditions analog image signals for input to cable 138 and receives timing and control signals for control of image sensor 132. In one embodiment, image sensor 132 and signal conditioning circuit 136 can be mounted on a common circuit board 137. In the embodiment of FIG. 2 an imaging axis 250 of apparatus 100 extends through head assembly 114.

In the embodiment of FIG. 2, head assembly 114 of apparatus 100 at a distal end of inspection tube 112 comprises image sensor 132. Image sensor 132 of inspection apparatus 100 can, in one alternative embodiment be located at a position spaced apart from head assembly 114, and disposed at a position rearward of a proximal end of inspection tube 112. For example, image sensor 132 can be disposed in base assembly 105 interfaced to elongated inspection tube 112 as shown in FIG. 2. An imaging system fiber optic bundle (not shown) can be disposed in elongated inspection tube 112, and can terminate in head assembly 114. The apparatus can be configured so that such a fiber optic bundle relays image forming light rays from head assembly 114 to the spaced apart image sensor spaced apart from head assembly 114.

Various circuits disposed at a position spaced apart from head assembly 114 can receive and process image signals generated by image sensor 132. In one embodiment, various circuits receiving and processing image signals generated by image sensor 132 can be disposed in base assembly 105 interfaced to elongated inspection tube 112 as shown in FIG. 2. In the exemplary embodiment of FIG. 2, analog front end circuit 150 can include an analog gain circuit, an analog-to-digital converter, and a correlated double sampler and can receive analog image signals, digitize such signals, and transmit digitized image signals to digital signal processor 152 (DSP). DSP 152, in the embodiment shown, can be configured to perform such processing tasks as color matrix processing, gamma processing, and can process digital image signals into a standardized video format, wherein video signals are expressed in a standardized date format. By way of example, video signals output by DSP 152 can be in a BT656 video format and data carried in the video signal can have a 422YCRCB data format. DSP 152 can be in communication with a random access memory 160 through system bus 158. Referring to further aspects of an electrical circuit for inspection apparatus 100, apparatus 100 can include timing generator circuit 156 which can send timing and control signals to signal conditioning circuit 136 for input to image sensor 132 as well as to analog front end circuit 150 and DSP 152. As indicated by communication line labeled "to 136," timing generator circuit 136 can send control signals such as exposure timing signals frame rate timing signals to signal conditioning circuit 136 for input to image sensor 132. In one embodiment, analog circuit front end 150, DSP 152, and timing generator circuit 156 can be provided on separate integrated circuits (ICs). In one embodiment, analog front end circuit 150, DSP 152, and tinting generator circuit 156 are provided as part of commercially available chips, e.g., an SS2 DSP chipset of the type available from SONY. While an analog to digital converter for converting analog image signals into digital form is described as being incorporated into front end circuit 150, such an analog to digital converter can be incorporated into an image sensor integrated circuit which commonly carries pixels of an image sensor and an analog to digital converter for digitizing analog image signals.

Referring to further aspects of apparatus 100, apparatus 100 can include DSP 180. DSP 180 can receive the formatted video output from DSP 152 for further processing. DSP 180 can be configured to perform a variety of processing tasks such as frame averaging, scaling, zoom, overlaying, merging, image capture, flipping, image enhancement, and distortion correction. DSP 180 can also be configured to perform motion detection as will be described more fully herein. In one embodiment, DSP 180 can be provided by a TMS32ODM642 Video/Imaging Fixed-Point Digital Signal Processor of the type available from TEXAN INSTRUMENTS. DSP 180 can be in communication with a volatile memory 161, e.g., RAM, a non-volatile memory 162, and storage memory device 164. Non-volatile memory 162 can be provided, e.g., by a flash memory device, an EEPROM memory device, or an EPROM memory device. Software for operating apparatus 100 can be retained in non-volatile memory 162 when apparatus 100 is not operating and such software can be loaded into RAM 161 when apparatus 100 is driven into an operating state. Apparatus 100 can include other types of storage memory. For example, a USB "thumb drive" can be plugged into serial I/O interface 172. A CompactFlash memory card can be plugged into parallel I/O interface 173. A memory of apparatus 100 can be regarded as including memory 161, 162, and 164, other storage memory, as well as internal buffer memories of DSP 152 and 180. Storage memory device 164 can be, e.g., a hard drive or removable disk. RAM 161, non volatile memory 162, and storage device 164 can be in communication with DSP 180 via system bus 159. While DSP 152 and DSP 180 are shown as being provided on separate integrated circuits, the circuits of DSP 152 and DSP 180 could be provided on a single integrated circuit. Also, the functionalities provided by DSP 152 and DSP 180 could be provided by one or more general purpose microprocessor IC.

Apparatus 100 can be configured so that image signals are read out of image sensor 132 row by row until a frame of image signal including image signals corresponding to multiple pixels of image sensor 132 have been read out. Analog image signals read out from image sensor 132 can be converted into digital form by front end circuit 150. Front end circuit 150, in turn, can feed digitized frame image signals into DSP 152. DSP 152 can format the image signals into a specific format before feeding the digitized image signals for further processing to DSP 180. Digitized frame image signals can be referred to as frame image data.

Referring to further circuit components of the block diagram of FIG. 2, apparatus 100 can further include display 210, keyboard 214, and joystick 218. Keyboard 214 enables a user to initiate various control signals for the control of apparatus 100. Display 210 enables display of live video streaming images and other images to an inspector. For example, apparatus 100 can be controlled to switch from a live streaming video mode in which a live streaming video is being displayed on display 210 to a mode in which a still image is displayed on display 210. Apparatus 100 can be configured so that apparatus 100 can generate control signals to selectively output a frame responsively to an action by an inspector. Apparatus 100 can be configured so that an inspector can initiate a control signal to selectively output a frame of image data by actuating a designated button of keyboard 214. Control signals for selective output of a frame of image data can include, e.g., a freeze frame control signal, and a save frame control signal. Apparatus 100 can be configured so that when a freeze frame control signal is initiated, apparatus 100 can repeatedly (continuously) output a frame from a frame buffer to display 210. The frame buffer can be continuously overwritten during the course of operation of the apparatus. The frame buffer can be a buffer of RAM 161, and can be, e.g., an input frame buffer, an output frame buffer, or an accumulator frame buffer. Apparatus 100 can be configured so that when a "save frame" control signal is initiated, apparatus 100 can output a frame from a frame buffer to an addressable memory location for future access, e.g., a memory location of RAM 161, non-volatile memory 162 and/or storage device 164. A frame of image data saved responsively to initiation of a save frame control signal can be formatted into a standardized or known proprietary file format. During performance of an inspection procedure, an inspector may initiate a save frame control signal several times to save numerous frames relating to a work subject (e.g., an equipment article) being subject to an inspection. A sensor interface of apparatus 100 can include keyboard 214, joystick 218, and display 210.

In a further aspect, DSP 180 can be coupled to a serial I/O interface 172, e.g., an ETHERNET or USB interface and a parallel data interface, e.g., a CompactFlash interface or PCMCIA interface. DSP 180 can also be coupled to a wireless data communication interface 174, e.g., an IEEE 802.11 interface. Apparatus 100 can be configured to send frames of image data saved in a memory thereof to an external computer and can further be configured to be responsive to requests for frames of image data saved in a memory device of apparatus 100. Apparatus 100 can incorporate a TCP/IP communication protocol suite and can be incorporated in a wide area network including a plurality of local and remote computers, each of the computers also incorporating a TCP/IP communication protocol suite. With incorporation of TCP/IP protocol suite, apparatus 100 incorporates several transport layer protocols including TCP and UDP and several different layer protocols including HTTP and FTP.

Referring to further aspects of apparatus 100, apparatus 100 can include joystick 218 for controlling a positioning of head assembly 114. In one embodiment, articulation cables 222 can be incorporated in elongated inspection tube 112 to enable movement of head assembly 114 into a desired position so that a field of view of apparatus 100 can be changed. Joystick 218 can be in communication with DSP 180. Apparatus 100 can be configured so that control signals for controlling movement (articulation) of head assembly 114 are initiated by manipulating joystick 218. Apparatus 100 can be configured so that when joystick 218 is moved, DSP 180 receives a control signal from joystick 218 and sends corresponding motor control signals to articulation motor 220 to produce a desired movement of head assembly 114. Apparatus 100 can also be configured so that joystick 218 operates as a pointer controller for controlling a pointer displayed on display 210.

In another aspect, inspection apparatus 100 can include a light source 230, (e.g., an arc lamp or a bank of one or more LEDs), which, like circuits 150, 152, 156, and 180 can be disposed at a position spaced apart from head assembly 114. Apparatus 100 can also include an illumination fiber optic handle 232 receiving light emitted from light source 230. Fiber optic bundle 232 can be disposed in elongated inspection tube 112 so that fiber optic bundle 232 can relay light emitted from light source 230 through inspection tube 112 and to head assembly 114. A distal end of fiber optic bundle 232 can be interfaced to diffuser 234 for diffusing illumination light. Fiber optic bundle 232 and diffuser 234 can be arranged to project light over an area approximately corresponding to a field of view of image sensor 132. In a further aspect, light source 230 can be powered by a regulator 248 coupled to a power supply circuit 250. Power supply circuit 250 can be arranged to power circuit board 252 receiving various integrated circuits of apparatus 100 as well as buses 158, 159. Power supply circuit 250 can be interfaced to various alternative power sources, e.g., serial I/O power source 254, AC/DC transformer source 256 and rechargeable battery 258.

During operation to output a live streaming video image on display 210, incoming frames may be input into an input frame buffer of RAM 161, subject to processing by DSP 180 and output to an output frame buffer of RAM 161. Apparatus 100 can be configured so that when a freeze frame control signal is initiated, a frame of an output frame buffer is continually output to display 210. Apparatus 100 can also be configured so that when a save frame control signal is initiated, a frame of an input frame buffer is output to an addressable memory location of a memory device, e.g., RAM 161, non-volatile memory 162, or long term storage device 164.

Figure 3:
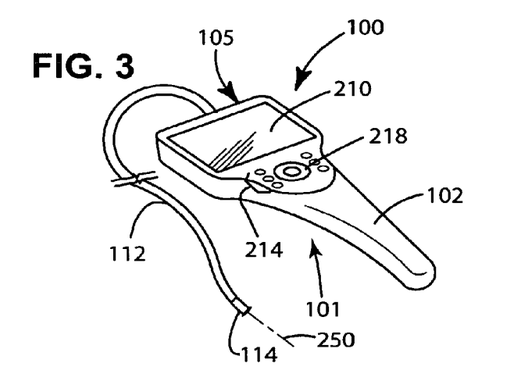
FIG. 3 is an alternative physical form view of an inspection apparatus.
Figure 4:
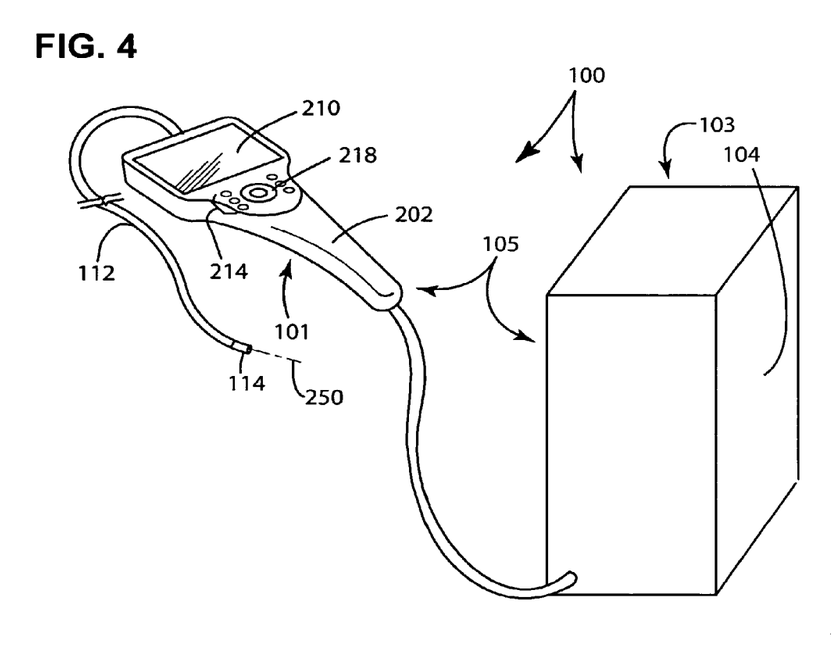
FIG. 4 is an alternative physical form view of as inspection apparatus.

Exemplary physical form views of the apparatus 100 shown in an electrical block view of FIG. 2 are shown in FIGS. 3 and 4. In the view of FIG. 3, apparatus 100 includes elongated inspection tube 112, and handset 101 incorporating housing 102, display 210, keyboard 214, and joystick 218. Circuits 150, 152, 156, 158, 160, 162, 164, 172 and 180 can be incorporated in housing 102. In the embodiment of FIG. 4, apparatus 100 includes a base unit 103 having a housing 104 incorporating a subset of the circuits shown in FIG. 2. For example, housing 104 can incorporate circuits 162, 164, 180, and 172. Handset 101 of FIGS. 3 and 4 can be a hand held handset sized and shaped to be held in a human hand. Skilled artisans will recognize that modifications to the circuit of FIG. 2 may be required if the circuits therein are described between a plurality of housings. For example, serial-deserializer circuits and twisted pair couplings as are explained in U.S. Provisional Patent Application No. 60/786,829 filed Mar. 27, 2006, incorporated herein by reference can be employed to transmit required video and control signals over distances of several feet at a high data rate. Additional circuits might be employed for communicating user initiated control signals generated at handset 101 to base unit 103. Additional circuits might also be employed for communicating image signals from base unit 103 to handset 101.

In one embodiment, apparatus 100 can have a base assembly 105, incorporating the components designated within dashed-in border 105 of FIG. 2. The components of base assembly 105 can be spread out into one or more housings. In the embodiment of FIG. 3, a single housing base assembly is provided. In the embodiment of FIG. 4, base assembly 105 comprises handset 101 and base unit 103. In another embodiment (not shown), base assembly 105 can include handset 101 and base unit. 103. However, rather than being interfaced to handset 101, elongated inspection tube 112 can be interfaced to base unit 103.

Figure 5:
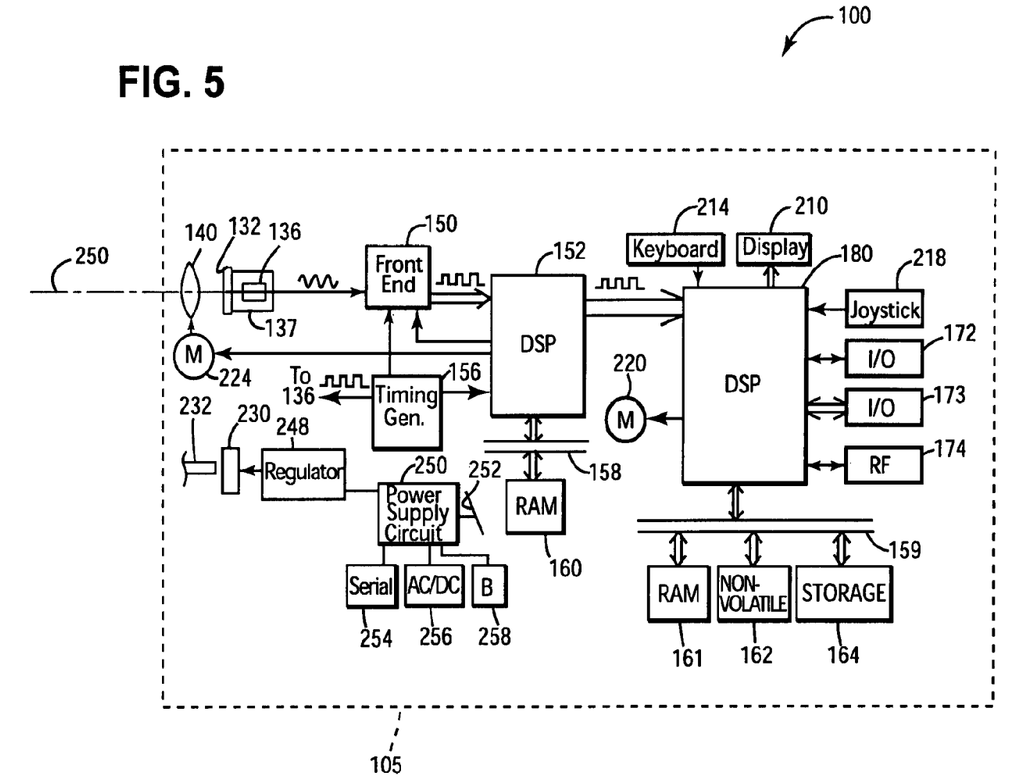
FIG. 5 is alternative electrical block diagram illustrating an exemplary set of circuits that can be incorporated in an inspection apparatus.

While methods described herein can be carried out utilizing an inspection apparatus having an elongated inspection tube, methods described herein can be carried out utilizing an inspection apparatus other than inspection apparatuses having an elongated inspection tube. In FIG. 5 there is shown an inspection apparatus 100 devoid of an elongated inspection tube. In the embodiment of FIG. 5, apparatus 100 is provisioned similarly to the embodiment of FIG. 2 except that imaging lens 140 as well as image sensor 132, signal conditioning circuit 136, and circuit board 137 are incorporated in base assembly 105. In the embodiment of FIG. 5, inspection apparatus 100 can include zoom lens motor 224 for varying a focal distance of inspection apparatus 100.

Figure 6:
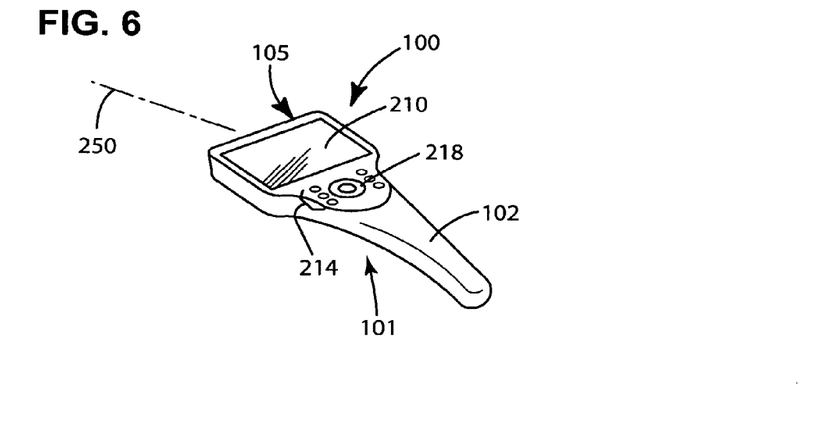
FIG. 6 is an alternative physical form view of an inspection apparatus.
Figure 7:
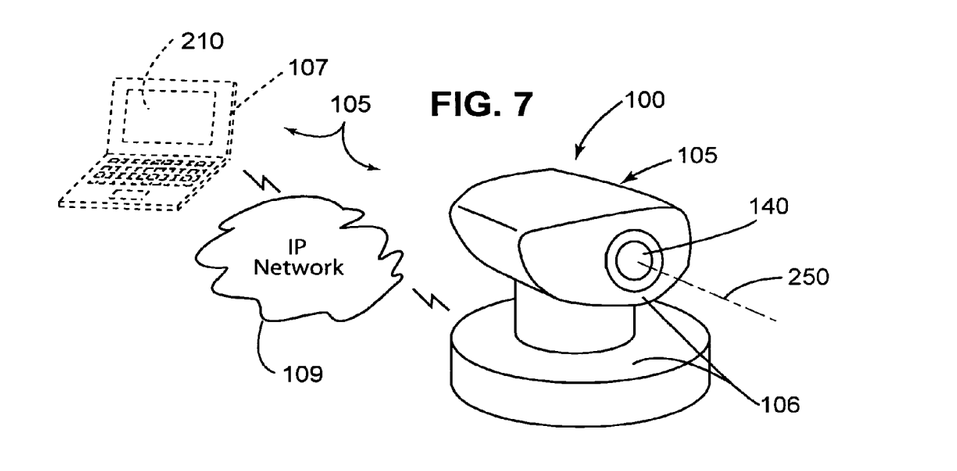
FIG. 7 is an alternative physical form view of an inspection apparatus.

Base assembly 105, in the embodiment of FIG. 5, can take on a variety of forms. In the embodiment of FIG. 6 showing an inspection apparatus in the form of a hand held digital camera, base assembly 105 is provided by a hand held housing 102. The embodiment of FIG. 6 is similar to the embodiment of FIG. 3 except that whereas in the embodiment of FIG. 3 imaging lens 140 as well as image sensor 132, signal conditioning circuit 136 and circuit board 137 are incorporated in head assembly 114, imaging lens 140 as well as image sensor 132, signal conditioning circuit 136 and circuit board 137 in the embodiment of FIG. 6 are incorporated in base assembly 105 which in the embodiment of FIG. 6 is provided by a hand held housing 102. In the embodiment of FIG. 6, imaging axis 150 of apparatus 100 extends through hand held housing 102. In the embodiment of FIG. 7, inspection apparatus 100 is provided in the form of a pan-tilt-zoom (PTZ) camera. A PTZ camera as shown in FIG. 7 can be adapted to be mounted on a flat surface such as a ceiling, wall, table, or such as may be provided by a mounting platform of a robot. A PTZ camera as shown in FIG. 7 can be used in a variety of inspection applications such as robot inspections and surveillance monitoring. In the embodiment of FIG. 7, circuit components can be incorporated as shown in FIG. 5 such that imaging lens 140 as well as image sensor 132, signal conditioning circuit 136, and circuit board 137 are incorporated in base assembly 105 provided as shown in FIG. 7 by PTZ camera housing 106. In the embodiment of FIG. 7, imaging axis 250 can extend through a camera housing 106 as shown in the embodiment of FIG. 7. Referring still to the embodiment of FIG. 7 which can incorporate the circuit distribution of FIG. 5, inspection apparatus 100 can incorporate motor assembly 222 for controlling a pan and tilt of the inspection apparatus when provided by an inspection apparatus in the form of a PTZ camera. Keyboard 214, display 210, and joystick 218 (pointer controller) can be provided on board PTZ camera housing 106 as shown in FIG. 7, or else may be distributed into an inspection apparatus housing spaced apart from PTZ camera housing 106. As indicated by dashed-in laptop PC housing 107 of FIG. 7, circuits of FIG. 5 can be distributed into housings extraneous from housing 106. A PC incorporated in housing 107 can include various circuits such as DSP 180 and other circuits and can be configured to perform various image processing methods as described herein. A PC incorporated in housing 107 can be connected to the PTZ cameral incorporated in housing via IP network 109. Inspection apparatus 100 can also be provided by a camera of a machine vision system for use in an assembly process or other industrial process.

An inspection apparatus as described in connection with FIG. 2 can be configured to perform a method as described in connection with the flow diagram of FIG. 1. Accordingly, there is described herein, in one embodiment an inspection apparatus comprising: an elongated inspection tube; a two dimensional image sensor comprising a plurality of pixels, the two dimensional image sensor generating image signals corresponding to light incident on said pixels, wherein said inspection apparatus is configured to be capable of: (i) responding to a user-initiated control signal to selectively output a frame of image date; (ii) processing image data of one or more frames to determine a motion parameter; and (iii) outputting a frame of image data responsively to said processing.

Referring again to the flow diagram of FIG. 1, further details and variations of a method that can be performed with use of apparatus 100 are described. As described to with reference to the block diagram of FIG. 2, a user can initiate a control signal to selectively output a frame of image data by actuating a button of keyboard 214. Apparatus 100 can be configured to responsively generate selective frame output control signal responsively to an action of an inspector; e.g., actuating a button of keyboard 214.

Figure 8:
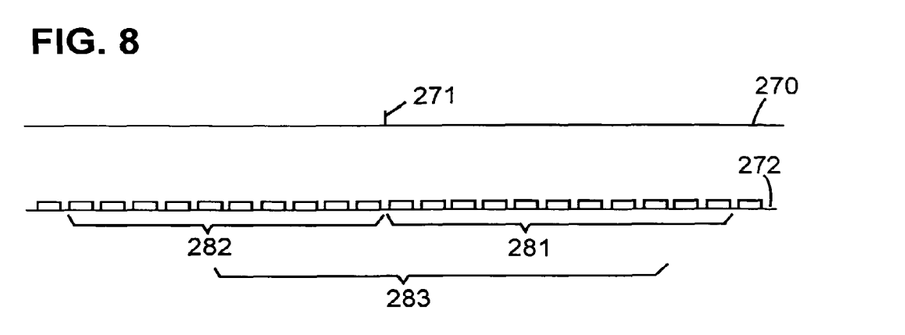
FIG. 8 is a timing diagram illustrating a timing of an initiation of a control signal to selectively output a frame of image data plotted against frame capture times.

At block 20, apparatus 100 can determine a motion parameter for each of at least one frame of image data. Apparatus 100, in one embodiment can be configured to execute block 20 subsequent to a time at which a control signal to selectively output a frame of image data at block 10 is initiated. Apparatus 100, in another embodiment can be configured so that apparatus 100 is executing processing block 20 at the time at which a control signal to selectively output a frame of image data is initiated. Apparatus 100 can be configured to execute processing block 20 in a number of different ways. For example, apparatus 100, in determining a motion parameter for each of one or more frames, can determine a binary (motion or motion free) motion parameter for a frame or can determine a qualitative motion parameter indicative of a degree of motion (e.g., can develop a motion scale from 0 to 9 where 0 is no motion and a 9 is maximum motion). Apparatus 100 can output a frame of image data responsively to initiation of a control signal to selectively output a frame of image data in a number of alternative possible ways. In one example, apparatus 100 can determine a motion parameter for a set of one to N frames. The set of one to N frames can be a set of successively captured frames of image data. Since the set of one to N frames can be captured within a certain time window, the set of one to N frames can be regarded as a "window." In FIG. 8, there are shown timelines 270, 272 illustrating a time of initiation of a control signal to selectively output a frame of image data plotted against frame capture times. Timeline 270 shows a time of initiation of a frame control signal to selectively output a frame (e.g., a freeze frame or a same frame control signal). In the specific embodiment of FIG. 8, the time of initiation of a control signal is referenced by reference numeral 271. Timeline 272 shows times at which single frames (i.e., frames having image data corresponding to a specific frame readout period) of image data are captured. Apparatus 100 can be configured to continuously capture frames of image data as indicated by timeline 272, wherein the leading edges are the times where a first pixel value for a frame is buttered in DSP 180 and the falling edges are the times where a last pixel value of a frame is buffered by DSP 180. Referring to FIG. 8, apparatus 100 can determine a motion parameter for one or more frames after a time of initiation of a control signal to selectively output a frame, (i.e., frames within window 281). However, as indicated, apparatus 100 can be processing frames of image data to ascribe a motion parameter score to each frame of image data processed prior to time that a frame control signal to selectively output a frame is initiated. It should be noted that in buffering a frame of image data, a frame buffer of apparatus 100 such as a buffer of DSP 180 need not buffer each pixel value making up a frame of image data simultaneously. A frame buffer may be used to buffer only a subset of pixel values (e.g., a few rows) making up a frame of image data at a given time.

In one embodiment, each frame of image data that is captured by apparatus 100 prior to a time of initiation of a control signal to selectively output a frame can be subject to processing to determine a motion parameter. In one embodiment a set of frames subject to motion parameter processing comprises only frames (i.e., frames of window 282) captured prior to the time of initiation of a control signal to selectively output a frame. In another embodiment, a set of frames subject to motion parameter processing comprises both frames captured prior to the time of initiation of a control signal to selectively output a frame and frames captured subsequent to the time of initiation of a frame control signal to selectively output a frame, i.e., frames of window 283 in one example. In another embodiment, only frames of image data captured after initiation of a control signal to selectively output a frame are subject to processing.

Rules for determining which frame of N frames subject to processing is to be selectively output can be varied. Where apparatus 100 develops a binary motion parameter, apparatus 100 can selectively output the first frame subject to processing having a "motion free" designation. Where apparatus 100 develops a motion parameter score, apparatus 100 can, after processing a set of N frames, selectively output the frame having the lowest motion score. When processing image data of a set of N frames to selectively output a frame having a lowest motion score, apparatus 100 can buffer each incoming frame to a designated frame buffer location unless the incoming frame has a higher motion score that the currently buffered frame, in which case the incoming frame can be discarded. In such manner it is not necessary to buffer image data of N frames simultaneously when processing image data of N frames for purposes of determining the frame having the lowest motion score.

A number of possible configurations for processing image data of one or more frames and to selectively output frame responsively to the processing are summarized in Table A. As will be described further herein, apparatus 100 can be configured so that the exemplary configurations are user-selective. Apparatus 100 can be configured so that apparatus 100 activates a different algorithm for selectively outputting a frame of image data depending on which configuration is active.

TABLE A

| Configuration | Window | Motion Parameter Developed | Decision |
|---|---|---|---|
| 1 | Process one to N frames captured after initiation of a selective frame output control signal | Binary "motion" or "motion free" | Selectively output first frame designated as motion free |
| 2 | Process N frames captured prior to initiation of a selective frame output control signal | Qualitative motion parameter developed (Score between 0-9) | Selectively output frame with lowest motion score |
| 3 | Process N frames wherein some frames are captured before initiation of a selective frame output control signal and some frames are captured after initiation of a selective frame output control signal | Binary "motion" or "motion free" | Selectively output first frame designated as motion free of Nth frame if no frame is designated as being motion free |
| 4 | Process N frames. The N frames may be captured before, during, or after initiation of a selective frame output control signal | Binary "motion" or "motion free" | Selectively output filtered frame if F successive frames are designated as being motion free |
| 5 | Process N frames. The N frames may be captured before, | Qualitative motion parameter developed (Score between | Selectively output frame with lowest motion score |

TABLE A-continued

| Configuration | Window | Motion Parameter Developed | Decision |
|---|---|---|---|
| | during, or after initiation of a selective frame output control signal | 0-9) | |

Methods for determining motion parameters are now described. Where image sensor 132 is of the type having an interlaced frame readout mode wherein an odd field of a frame is read out and then an even field, motion can be detected for by subtracting the even field from the odd field. The difference result can be scaled to yield a motion parameter score, e.g., between 0 and 9 wherein 0 is a score for no motion and 9 is a score for extensive motion. When head assembly 114 is not in motion, a motion parameter score can be expected to be about 0, though diagonal lines and/or horizontal edges may cause non-zero difference results. Even so, such analysis of frames including such diagonal lines and/or horizontal edges generally yields lower difference results for motion-free frames than for frames with motion. For converting a score to a binary motion parameter, i.e., "in motion" or "motion free" clarification, the score can be subject to thresholding (i.e., all scores below 2 are deemed to be motion free).

In another method for detecting motion, apparatus 100 can examine first and second successively captured frames. In examining first and second successively captured frames, apparatus 100 can locate one or more common edges in first and second frames, and can subtract pixel positions forming the common edge of the second frame from the first frame to derive a motion parameter scalable to scale, e.g., from 0 to 9. When head assembly 114 is not in motion, a motion parameter degree of motion score can be expected to be about 0. For converting a score to a binary motion parameter, i.e., "in motion" or "motion free" classification, the score can be subject to thresholding (i.e., all scores below 2 are deemed to be motion free).

In yet another method for detecting motion, apparatus 100 can examine image data of several frames in the form of first and second successively determined super frames. Each super frame can be determined by processing a set of M successively captured single frames. The processing can include, e.g., averaging or summing M successively captured frames. In one example, with a set of 10 successively captured frames, 0 to 9, a first super frame can be derived by averaging frames 0 through 4 and the second super frame can be derived by averaging frames 5 through 9. For conservation of processing requirements, accumulators may be employed for averaging. Super frames can be determined on a moving window basis. For example, during a first frame period, a first accumulator can retain the average or sum of frames N . . . (N+4), and a second accumulator can retain the average or sum of frames (N+5) . . . (N+9). In a next frame period, the first accumulator can retain the average or sum of frames (N+1) . . . (N+5) and the second accumulator can retain the average or sum of frames (N+6) . . . (N+10). In examining first and second successively captured super frames, apparatus 100 can locate a common edge in first and second super frames, and subtract pixel positions forming the common edge of the second super frame from the first super frame to derive a motion parameter scalable to scale, e.g., from 0 to 9. When head assembly 114 is not in motion, a motion parameter score can be expected to be about 0. For converting a score to a binary motion parameter, i.e., "in motion" or "motion free" classification, the score can be subject to thresholding (i.e., all scores below 2 are deemed to be motion free). In another embodiment, apparatus 100 can be configured to subtract a super frame from a preceding super frame for purposes of developing a motion parameter. The inventor found that processing of super frames for motion detection is particularly advantageous under lower brightness (and, therefore, under higher expected noise) conditions. In one embodiment, apparatus 100 can be configured to process incoming image data for detection of brightness and can further be configured to automatically switch from a mode of operation in which single frames are processed for motion detection to a mode in which super frames are processed for motion detection when it is determined that brightness has fallen below a threshold brightness level.

In another embodiment, apparatus 100 when outputting a frame at block 30 responsively to a processing at block 20 can output a noise reduced frame. A noise reduced frame can be provided by processing a plurality of captured single frames as in a super frame. The plurality of frames that can be processed for providing a noise reduced frame can be successive frames or non-successive frames. For example, apparatus 100, as described in connection with FIG. 9 can be configured to process a set of 128 frames ($F_0$ . . . $F_{127}$) in determining a noise reduced frame. In processing the frames, apparatus 100 can determine if the frames are in motion, and can discard frames determined to be in motion. In discarding a frame, apparatus 100 can avoid inputting a frame determined to be in motion into an accumulator retaining a noise reduced frame. Apparatus 100 can also be configured to locate an edge in each frame and offset frames of the set of frames so that located edges are aligned. In offsetting a frame, apparatus 100 can offset a frame prior to accumulating the frame in an accumulator. Processing of a plurality of frames to determine a super frame can include averaging several frames or by otherwise utilizing image data from the plurality of frames to provide a noise reduced frame. A noise reduced frame provided by averaging a plurality of successively captured frames can be regarded as a frame averaged noise reduced frame. A noise reduced frame can also be regarded as a "filtered" frame. Where apparatus 100 is configured to output a noise reduced frame responsively to an initiation of a control signal to selectively output a frame, apparatus 100 can be configured to determine a binary "in motion" or "motion free" motion parameter classification for each frame of image data that is subject to processing. Apparatus 100 can further be configured so that when a first frame is determined to be motion free, an accumulator begins to maintain an accumulated average frame for a next set of F frames. Apparatus 100 can also be configured so that when F frames have been accumulated into the average frame accumulator, and with each frame being motion free, and with a selective frame output control signal being initiated within a predetermined time window of F motion free frames being accumulated, the accumulated average frame determined by averaging the F frames is saved into a memory of apparatus 100.

Accordingly, there is described herein, in one embodiment, a method for operating an inspection apparatus of the type having an elongated inspection tube and an image sensor generating image signals, said method comprising the steps of: configuring said inspection apparatus to process a plurality of frames to provide a noise reduced frame of image data; generating a control signal to selectively output a frame responsively to an action by a user to initiate said control signal to selectively output a frame, processing image data to determine a motion parameter; and, subsequent to generation of said control signal to selectively output a frame, outputting a noise reduced frame responsively to said processing to determine a motion parameter. The noise reduced frame can be output to a display and/or a memory device, e.g., device 161, 162 and/or 164.

An embodiment wherein a noise reduced frame (which can be regarded as a "filtered" frame) can be output responsively to an initiation of a control signal to selectively output a frame is summarized herein in Table A (See configuration 4 of Table A). In one embodiment, the candidate configurations summarized in Table A are user selectable.

Figure 9:
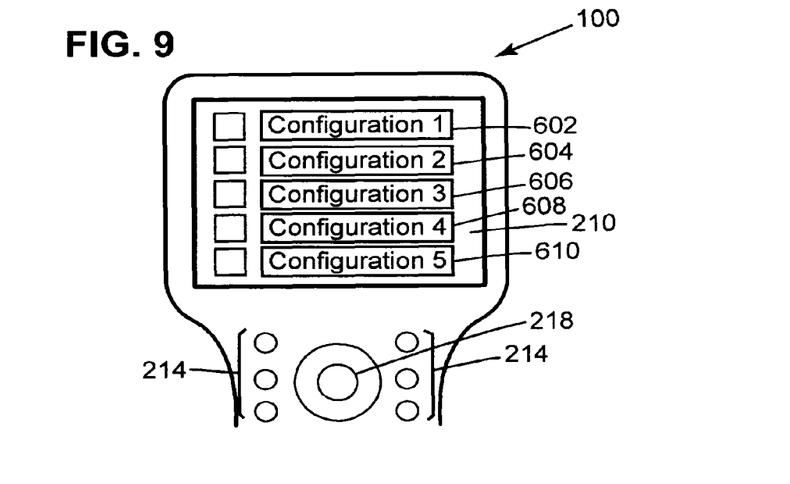
FIG. 9 is a view of an inspection apparatus having a graphical user interface allowing selection of various frame selection algorithms that can be executed by an inspection apparatus.

As shown in FIG. 9, apparatus 100 can be configured to display designators (e.g., text or icons) corresponding to each configuration summarized in Table A. Apparatus 100 can also be configured so that an inspector can highlight a different designator 602, 604, 606, 608, 610 by moving joystick 218 and further so that an inspector can select a given configuration by actuating a button of keyboard 214 when designator corresponding to a designated configuration is highlighted. The user interface of FIG. 9 having displayed designators for each of several configurations can be regarded as a graphical user interface (GUI). Accordingly, there is described herein, in one embodiment, an inspection apparatus comprising: an elongated inspection tube; a two dimensional image sensor comprising a plurality of pixels, the two dimensional image sensor generating image signals corresponding to light incident on said pixels, a user interface enabling a user to activate first or second configurations, the apparatus being adapted so that when said first configuration is active, said apparatus selects a frame for outputting according to a first algorithm, said apparatus further being adapted so that when said second configuration is active said apparatus selects a frame for outputting according to a second algorithm, wherein said second algorithm is different than said first algorithm; wherein said inspection apparatus is further configured to allow a user to initiate a control signal to selectively output a frame of image data; and wherein said inspection apparatus subsequent to an initiation of a control signal to selectively output a frame of image data selects a frame of image data for outputting in a manner that varies depending on whether said first configuration or said second configuration has been selected.

In another aspect, inspection apparatus 100 can be configured to apply digital gain non-uniformly over a frame of image data. In one embodiment, apparatus 100 can be configured to determine position dependent digital gain parameters for pixel values of a frame of image data and to apply the determined position dependent digital gain parameters in determining pixel values of a frame of image data for outputting a display and/or a memory device. The frame of image data for which non-uniform digital gain parameters (non-uniform and offset parameters) can be determined can be a frame corresponding to a field of view of apparatus 100.

Inspection apparatuses are often used to capture frames of image data representing shiny surfaces. When a frame of image data representing a shiny surface is captured, illumination tends to reflect off the shiny surface causing what is often termed an over-bloomed bright spot in a frame of image data. In that bright spots will affect an overall brightness level used to determine applied digital gain and/or exposure parameters according to an imaging parameter determining algorithm, the presence of over-bloomed bright spots can lead to applied exposure period parameters and/or analog gain being too low, resulting in a frame of image data that is too dark in all but the area of an over-bloomed bright spot.

For addressing the problem of over-bloomed bright spots, inspection apparatus 100 can be configured to apply digital gain non-uniformly over a frame of image data in order to selectively brighten a frame of image data in areas other than a bright spot without substantial or without any brightening of a frame of image data in an area about a bright spot. Inspection apparatus 100 can also be configured to apply offsets non-uniformly over a frame of image data in order to reduce a washout effect of a frame of image data.

An exemplary method for outputting a frame of image data utilizing a set of position dependent non-linear digital gain values is as follows:

1. Add up luminance (e.g., gray scale) values for pixel positions within a region surrounding each pixel position (e.g., a 16×16 pixel position area) to obtain a regional brightness value for each pixel position.
2. Provide a lookup table mapping regional sum values to digital gain values (parameter). The lookup table, in one embodiment, can map larger digital gain values to smaller regional brightness values and zero or near-zero digital gain values to larger regional brightness values.
3. Determine a position dependent digital gain value utilizing the lookup table for each pixel position.
4. For each pixel position multiply the original pixel value by the determined digital gain value.

Figure 10:
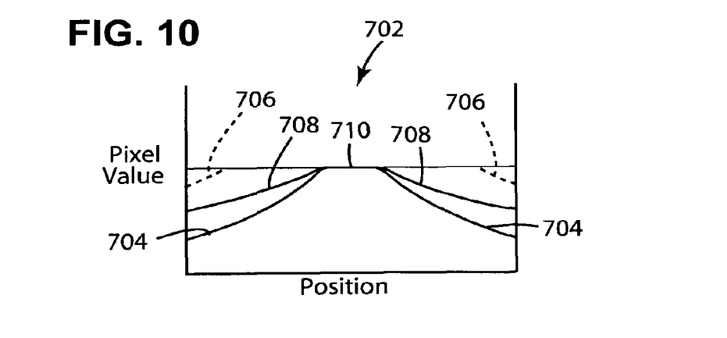
FIG. 10 is a plot illustrating application of non-uniform digital gain in one embodiment.

The result of applying non-uniform digital gain values determined responsively to the determination of regional brightness values is described in greater detail with reference to the plot of FIG. 10 showing pixel values through an arbitrary line of pixel positions within a bright region of pixel positions.

Referring to plot 702, line 704 indicates pixel brightness values for a row of pixels which is relatively dark at the left side and gradually brightens across the line. At the right side of the row, the brightness values clipped at the maximum possible value (e.g., 255 in an 8 bit pixel value frame), as shown by line 710. Dotted line 706 indicates a would-be pixel values if gain were applied uniformly, and bold line 708 indicates pixel values where non-uniform digital gain as described herein is applied. Referring to plot 702 it is seen with reference to the original image data 704 that several pixel values may be clipped at the peak 710 pixel value (indicating a possible over-bloomed bright spot). However, referring to image data 706 after application of a uniform digital gain parameter, several additional pixels can be clipped at the peak pixel value, resulting in loss of contrast information useful to an inspector. Referring to image data 708 after application of non-uniform digital gain, digital gain may be applied to increase pixel values in the non-clipped portions of the row; however, substantially no additional pixel values are clipped at the maximum pixel value. Accordingly, by application of the non-uniform gain parameters determined responsively to a determination of regional brightness values, clipping of additional pixel values is substantially avoided. According to the method described herein, wherein non-uniform digital gain parameters are determined responsively to a determination of regional brightness values, pixel positions of relatively darker pixel valued regions of a frame (darker regions) can have applied thereto digital gain parameters which would result in clipping of pixel values of pixel positions of relatively brighter pixel value regions (brighter regions) of a frame. Also, pixel positions of a relatively bright pixel value region of a frame can have applied thereto digital gain parameters smaller in value than the digital gain parameters applied to the relatively darker pixel position region. Application of the relatively smaller digital gain parameters determined responsively to a determination of a regional brightness value within a region will result in clipping of a fewer number of pixel values than would have been clipped by application of uniform gain parameter sufficient to render darker pixel values visibly brighter. A region can be regarded herein as a set of positionally adjacent pixel positions, e.g., a block of 16×16 positionally adjacent pixel positions.

In addition, another lookup table can be provided to provide mapping between regional sum values and a set of offset values (parameters). Such mapping can map larger offset values to smaller regional brightness values and little or no offset values to larger regional brightness values to reduce a "washout effect" when only digital gain is used. For example, when gain is applied to a frame, fine detail transitions might be amplified, but nevertheless, may not be rendered highly visible if the image data forming a transition has high white values (e.g., the human eye has difficulty in perceiving differences in differentiated but high gray scale values). For example, a human eye may have difficulty in perceiving an edge formed by an edge comprising 220 and 250 white level pixel values (the "washout effect"). The washout effect can be addressed by applying an offset, e.g., subtracting 100 from the area of the transition so that it is represented by pixel values having white levels of 120 and 150. For improving a quality of an image, offset can be applied non-uniformly by mapping pixel positions to offset parameters as indicated. For example, so that a white spot retains its appearance as a white spot in a frame of image data having offsets applied, it would not be desirable to have offsets applied to a white spot. By application of non-uniform offset pixel values of pixel positions that are in relatively dark regions prior to application of gain can be reduced by an offset so that transitions represented therein can be rendered more visible to an observer (e.g., an inspector). Pixel values of pixel positions of relatively bright regions prior to application of gain can have relatively little offset applied so that they are represented in accordance with their original brightness levels.

In one embodiment, the frame of image data to which non-uniform digital gain and/or offset parameters are applied can be a buffered frame of image data of an output frame buffer for output to display in a streaming video display.

In another embodiment, the frame of image data to which non-uniform digital gain and/or offset parameters are applied can be a frame of image data output to a memory device from a frame buffer (e.g., an input frame buffer) in response to an initiation of save frame control signal.

In another embodiment, the frame of image data to which non-uniform digital gain and/or offset parameters can be applied can be a frame of image data output to a display from a frame buffer (e.g., an output frame buffer) responsively to a processing of image data for determination of a motion parameter.

In another embodiment, the frame of image data to which non-uniform digital gain and/or offset parameters can be applied can be a noise reduced frame provided by processing of several frames and retained in art accumulator buffer as described herein. A noise reduced frame provided by processing of several single frames can be output to a display responsively to a processing of image data for determination of a motion parameter. Such a noise reduced frame to which non-uniform digital gain and/or offset parameters can be applied can also be frame that is output to a memory device in response to an initiation of a save frame control signal. By applying non-uniform digital gain and/or offset parameters to a frame provided by processing of several single frames, noise is reduced prior to the application of the digital gain. Thus, the applied digital gain tends to make image details more visible without creating a high noise level as may occur when digital gain is applied to a single potentially noisy frame. Additionally, where non-uniform digital gain and/or offset parameters are applied to a frame provided by processing several single frames, the accumulation of frames effectively increases the dynamic range available (such as from an 8-bit single frame to a 16-bit accumulator) allowing the application of digital gain without reducing the number of achievable output levels as described previously with uniform digital gain. It may further be desirable to use different digital gain and offset tables based on the number of accumulated frames such that lower gains are applied when few frames are accumulated and higher gains are applied when more frames are accumulated. This approach minimizes the amplification of image noise when few frames are accumulated while allowing significant enhancement with little noise once many frames have been accumulated. It also provides a gradual transition in the image appearance which is generally preferred over abrupt changes as would be seen if no enhancement were applied while in motion and full enhancement were applied when motion stops and frame accumulation begins.

A small sample of the methods of an apparatus described herein are as follows.

There is also described (A1) A method for operating an inspection apparatus having an elongated inspection tube and an image sensor for generating image signals, said method comprising the steps of: (a) initiating a control signal to selectively output a frame of image data; (b) processing image data of one or more frames to determine a motion parameter; and (c) subsequent to initiation of said control signal to selectively output a frame, outputting a frame of image data responsively to said processing referred to in step (b). There is also described (A2) The method of claim A1, wherein said processing step (b) comprises processing less than a full frame of image data. There is also described (A3) The method of claim A1, wherein said control signal is a freeze frame control signal. There is also described (A4) The method of claim A1, wherein said control signal is a save frame control signal. There is also described (A5) The method of claim A1, wherein said outputting step includes the step of outputting a single frame. There is also described (A6) The method of claim A1, wherein said processing includes processing of frames of image data captured prior to a time of initiation of said control signal. There is also described (A7) The method of claim A1, wherein said processing includes processing of frames of image data captured subsequent to a time of initiation of said control signal. There is also described (A8)

The method of claim A1, wherein said motion parameter is a parameter classifying a frame of image data as an "in motion" frame or a "motion free" frame. There is also described (A9) The method of claim A1, wherein said motion parameter is a qualitative parameter indicating a degree of motion. There is also described (A10) The method of claim A1, wherein said frame of image data responsively output in step (c) is a noise reduced frame of image data provided by processing of several single frames. There is also described (A11) The method of claim A1, wherein said frame of image data responsively output in step (c) is a noise reduced frame having applied thereto at least one of a set of non-uniform gain parameters and a set of non-uniform offset parameters, the at least one of a set of non-uniform gain parameters and a set of non-uniform offset parameters being provided for brightening darker areas of said noise reduced frame without substantial or without any brightening of a bright spot of said noise reduced frame of image data. There is also described (A12) The method of claim A1, wherein said frame of image data responsively output in step (c) is a noise reduced frame having applied thereto a set of position dependent non-uniform gain parameters determined responsively to a determination of regional brightness values in a frame of image data. There is also described (A13) The method of claim A1, wherein said outputting step includes the step of outputting a noise reduced filtered frame. There is also described (A14) The method of claim A1, wherein said outputting step includes the step of outputting a noise reduced filtered frame, the noise reduced filtered frame being provided by processing of several frames. There is also described (A15) The method of claim A1, wherein said processing includes processing of a plurality of frames to determine a super frame. There is also described (A16) The method of claim A1, wherein said method includes the steps of detecting brightness of incoming image data and responsively to a determination that brightness has fallen below a threshold brightness processing super frames in step (b) for determination of a motion parameter. There is also described (A17) The method of claim A1, wherein said outputting step includes the step of repeatedly outputting a buffered frame buffered in a frame buffer to a display. There is also described (A18) The method of claim A1, wherein said outputting step includes the step of outputting a buffered frame to a memory device.

There is also described (B1) An inspection apparatus comprising: an elongated inspection tube; (a) a two dimensional image sensor comprising a plurality of pixels, the two dimensional image sensor generating image signals corresponding to light incident on said pixels; (b) a user interface enabling a user to activate first or second configurations, the apparatus being adapted so that when said first configuration is active, said apparatus selects a frame for outputting according to a first algorithm, said apparatus further being adapted so that when said second configuration is active said apparatus selects a frame for outputting according to a second algorithm, wherein said second algorithm is different than said first algorithm; (c) wherein said inspection apparatus is further configured to allow a user to initiate a control signal to selectively output a frame of image data; and (d) wherein said inspection apparatus subsequent to an initiation of a control signal to selectively output a frame selects a frame of image data for outputting in a manner that varies depending on whether said first configuration or said second configuration has been selected. There is also described (B2) The inspection apparatus of claim B1, wherein said inspection apparatus, when said first configuration is active, determines a binary motion parameter, and when said second configuration is active, determines a qualitative motion parameter. There is also described (B3) The inspection apparatus of claim B1, wherein said user interface is a graphical user interface displaying a designator for each of said first and second configurations.

There is also described (C2) An inspection apparatus comprising: (a) an elongated inspection tube; (b) a two dimensional image sensor comprising a plurality of pixels, the two dimensional image sensor generating image signals corresponding to light incident on said pixels; (c) wherein said inspection apparatus is configured to be capable of: (i) responding to a user-initiated control signal to selectively output a frame of image data; (ii) processing image data of one or more frames to determine a motion parameter; and (iii) selectively outputting a frame of image data responsively to said processing. There is also described (C2) The apparatus of claim C1, wherein said control signal is a freeze frame control signal. There is also described (C3) The apparatus of claim C1, wherein said control signal is a save frame control signal. There is also described (C4) The apparatus of claim C1, wherein said outputting step includes the step of outputting a single frame. There is also described (C5) The apparatus of claim C1, wherein said processing includes processing of frame image data captured prior to a time of initiation of said control signal to selectively output a frame of image data. There is also described (C6) The apparatus of claim C1, wherein said processing includes processing of frame image data captured subsequent to a time of initiation of said control signal to selectively output a frame of image data. There is also described (C7) The apparatus of claim C1, wherein said motion parameter is parameter classifying a frame of image data as a motion frame or a motion free frame. There is also described (C8) The apparatus of claim C1, wherein said motion parameter is a parameter indicating a qualitative level of motion. There is also described (C9) The apparatus of claim C1, wherein said frame is a noise reduced frame generated by processing multiple frames of image data. There is also described (C10) The apparatus of claim C1, wherein said processing comprises averaging multiple frames of image data. There is also described (C11) The apparatus of claim C1, wherein said apparatus in outputting said frame outputs a noise reduced frame provided by processing of several single frames.

There is also described (D1) A method for operating an inspection apparatus of the type having an elongated inspection tube and an image sensor generating image signals, said method comprising the steps of: (a) configuring said inspection apparatus to process a plurality of frames to provide a noise reduced frame of image data, (b) generating a control signal to selectively output a frame responsively to an action by a user to initiate said control signal; (c) processing image data to determine a motion parameter for a plurality of frames of image data; and (d) subsequent to generation of said control signal to selectively output a frame, outputting said noise reduced frame of image data responsively to said processing step (c). There is also described (D2) The method of claim D1, wherein said apparatus in executing said processing step (c) and said outputting step (d) determines whether several successive frames are motion free and outputs a said noise reduced frame if each of said several frames are determined to be motion free. There is also described (D3) The method of claim D1, wherein said configuring step comprises the step of configuring said inspection apparatus to average a plurality of frames to provide a noise reduced frame of image data.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of operating an inspection device to inspect industrial equipment, comprising:
   collecting a plurality of successive image frames of the industrial equipment using an image sensor of the inspection device;
   displaying the plurality of successive image frames on a display of the inspection device;
   processing, via a processor of the inspection device, each image frame of the plurality of successive image frames by:
      determining a motion parameter of each respective image frame, wherein the motion parameter is indicative of motion of the image sensor of the inspection device when the respective image frame is collected; and
      summing pixel values from each respective image frame in a super frame accumulator when the respective image frame is determined to be motion free based on the motion parameter;
   receiving a control signal from a user interface of the inspection device requesting an image frame output;
   generating, via the processor of the inspection device, a noise-reduced image frame of the industrial equipment from the pixel values in the super frame accumulator in response to the control signal; and
   outputting the noise-reduced image frame of the industrial equipment in response to the control signal.

2. The method of claim 1, wherein determining the motion parameter comprises determining a motion score of each respective image frame of the plurality of successive image frames, and wherein each respective image frame is determined to be motion free when the motion score of each respective image frame is below a threshold value.

3. The method of claim 1, wherein the control signal comprises a freeze frame control signal, and wherein outputting the noise-reduced image frame comprises repeatedly displaying the noise-reduced image frame of the industrial equipment on the display of the inspection device in response to the control signal.

4. The method of claim 1, wherein the control signal comprises a save frame control signal, and wherein outputting the noise-reduced image frame comprises saving the noise-reduced image frame of the industrial equipment on a storage device of the inspection device in response to the control signal.

5. The method of claim 1, wherein summing the pixel values from each respective image frame in the super frame accumulator comprises summing the pixel values from each respective image frame in the super frame accumulator when the respective image frame is collected prior to receiving the control signal.

6. The method of claim 1, wherein summing the pixel values from each respective image frame in the super frame accumulator comprises summing the pixel values from each respective image frame in the super frame accumulator when the respective image frame is collected after receiving the control signal.

7. The method of claim 1, wherein the noise-reduced image frame of the industrial equipment is a super frame that is the sum of the pixel values from each respective image frame summed in the super frame accumulator.

8. The method of claim 1, wherein the noise-reduced image frame of the industrial equipment is a super frame that is the average of the pixel values from each respective image frame summed in the super frame accumulator.

9. A method of operating an inspection device to inspect industrial equipment, comprising:
   collecting a plurality of successive image frames of the industrial equipment using an image sensor of the inspection device;
   processing, via a processor of the inspection device, each image frame of the plurality of successive image frames by:
      determining a motion score of each respective image frame, wherein the motion score is indicative of motion of the image sensor of the inspection device when the respective image frame is collected; and
      summing pixel values from each respective image frame in at least one super frame accumulator when the motion score of the respective image frame is below a threshold value;
   generating, via a processor of the inspection device, a plurality of noise-reduced images frames of the industrial equipment from the pixel values in the at least one super frame accumulator;
   displaying the plurality of noise-reduced image frames of the industrial equipment on a display of the inspection device;
   receiving a control signal from a user interface of the inspection device requesting an image frame output; and
   outputting a noise-reduced image frame of the industrial equipment from the plurality of noise-reduced image frames in response to the control signal.

10. The method of claim 9, wherein the control signal comprises a freeze frame control signal, and wherein outputting the noise-reduced image frame of the industrial equipment comprises repeatedly displaying the noise-reduced image frame of the industrial equipment on the display of the inspection device.

11. The method of claim 9, wherein the control signal comprises a save frame control signal, and wherein outputting the noise-reduced image frame of the industrial equipment comprises storing the noise-reduced image frame of the industrial equipment on a storage device of the inspection device.

12. The method of claim 9, wherein summing the pixel values from each respective image frame in the at least one super frame accumulator comprises summing the pixel values from each respective image frame in the at least one super frame accumulator when each respective image frame is collected after receiving the control signal.

13. The method of claim 9, wherein the plurality of noise-reduced image frames of the industrial equipment is a plurality of super frames, where each of the plurality of super frames is the sum of the pixel values from each respective image frame summed in the at least one super frame accumulator.

14. The method of claim 9, wherein the plurality of noise-reduced image frames of the industrial equipment is a plurality of super frames, where each of the plurality of super frames is the average of the pixel values from each respective image frame summed in the at least one super frame accumulator.

15. An industrial inspection system, comprising:
an elongated inspection tube configured to be inserted into an industrial system;
an image sensor coupled to the elongated inspection tube, wherein the image sensor is configured to collect a plurality of successive image frames of the industrial system via the elongated inspection tube;
a super frame accumulator configured to store a summed image frame; and
a processor configured to, for each image frame of the plurality of successive image frames:
determine a motion score for the image frame that is indicative of motion of the image sensor when the image frame is collected;
determine whether the image frame is motion free based on the motion score; and
sum pixel values of the image frame to the summed image frame stored in the super frame accumulator when the image frame is determined to be motion free based on the motion score;
wherein the processor is configured to generate a noise-reduced image frame of the industrial system from the summed image frame stored in the super frame accumulator in response to receiving a control signal.

16. The industrial inspection system of claim 15, wherein the processor is configured to generate the noise-reduced image frame of the industrial system from the summed image frame before receipt of the control signal.

17. The industrial inspection system of claim 15, comprising a user interface configured to provide the control signal to the processor in response to user input, wherein the control signal comprises a freeze frame control signal or a save frame control signal.

18. The industrial inspection system of claim 15, comprising a display configured to display the plurality of successive image frames of the industrial system.

19. The industrial inspection system of claim 18, wherein the display is configured to repeatedly display the noise-reduced image frame of the industrial system in response to the processor receiving the control signal.

20. The industrial inspection system of claim 15, comprising a storage device, wherein the processor is configured to output the noise-reduced image frame of the industrial system to the storage device in response to receiving the control signal.

* * * * *